United States Patent Office 3,658,741
Patented Apr. 25, 1972

---

3,658,741
HOMOGENEOUS COPOLYMERS FROM ETHYLENE
Harry Knutson, Brookside, and John E. Dench, Mount Fern, N.J., assignors to Allied Chemical Corporation, New York, N.Y.
No Drawing. Filed Sept. 19, 1966, Ser. No. 580,196
Int. Cl. C08f 1/04, 15/00, 47/18
U.S. Cl. 260—29.6 H
32 Claims

ABSTRACT OF THE DISCLOSURE

Homogeneous copolymers of ethylene and a comonomer selected from the group consisting of unsaturated carboxylic acids and esters and salts thereof may be prepared by reacting the monomers in the presence of a chain transfer agent and a free radical catalyst in the vapor phase at a temperature between 100° C. and 300° C. and at a pressure between 100 and 1000 atmospheres, with turbulent agitation within an enclosed enlarged reaction zone, and with the feed, off-gas discharge and product withdrawal so controlled as to maintain the ratio of weight percent comonomer in the product to weight percent comonomer in the feed within the range of 0.7:1 to 1.8:1.

---

This invention relates to the production of homogeneous copolymer of ethylene. More particularly the invention relates to the continuous polymerization of ethylene and various comonomers under specific conditions such that homogeneous copolymers are produced and to certain new and improved copolymers obtained from such polymerization. The invention further relates to new and improved products, especially wax compositions, obtainable from the improved copolymers provided by the present invention. Illustrative of the comonomers combined with the ethylene in the process and copolymers of the invention are the unsaturated acids such as acrylic acid and derivatives thereof, such as the esters and amides.

Processes for copolymerization of ethylene with numerous comonomers are well known and much investigated. It has been also heretofore proposed to copolymerize ethylene and various unsaturated acids and esters thereof such as acrylic acid and methacrylates. One such prior art proposal is found in U.S. Pat. 3,141,870 which describes a process for catalytic copolymerization of ethylene with methacrylate or methyl methacrylate in a small tubular reactor at pressures of the order of 20,000 to 40,000 p.s.i. and temperatures of 150–250° C., optionally in the presence of acetone. In such process the ratio of comonomer in the product to comonomer in the feed is typically 3.5 and the product itself is specifically stated to be non-homogeneous in that the comonomer concentration combined in any given unit of the copolymer varies considerably from the comonomer concentration combined in other units with the further result that said product actually contains ethylene homopolymers. Other processes for copolymerization of ethylene and acrylic acids or esters are described in U.S. Pat. 2,953,551 involving a small tubular reactor, high pressure and catalyst, and U.S. Pat. 3,089,897 involving a coil reactor, catalyst, pressures between 1,000 to 10,000 p.s.i. and temperatures of 150–400° C. In both the latter described processes the ratio of percent comonomer in the product to percent comonomer in the feed is typically at least 3 to 1. Heterogeneous or non-homogeneous products obtained by the heretofore proposed processes and characterized by high molecular weight have varying utility restricted in certain areas because the non-homogeneous nature of the copolymer.

The low molecular weight non-homogeneous polymers are particularly characterized by being soft, even liquid, and further by marked deficiencies making the same unsuitable for use in numerous important polymer applications.

An object of the present invention is to produce homogeneous copolymers of ethylene with certain unsaturated acid and ester comonomers such as acrylic acid and methacrylates.

Another object is to provide a process for producing such homogeneous ethylene copolymers.

Another object is to provide new and improved homogeneous copolymers containing ethylene A further object is to provide new and improved low molecular homogeneous copolymers containing ethylene as the major copolymer component.

A still further object is to provide new and improved useful products from low molecular homogeneous copolymers containing ethylene.

Other objects and advantages will be evident from the following description of the invention.

In accordance with the present invention homogeneous copolymers containing a major portion of ethylene are produced by subjecting ethylene and a comonomer to reaction along with a chain transfer agent and free radical catalyst, under conditions such that all are substantially in the vapor phase with turbulent agitation at a temperature between 100–300° C. and high pressure between 150–1000 atmospheres, and such that equilibrium is established and a thermally self-sustaining reaction is maintained, desirably at substantially constant temperature and pressure varying by no more than about ±10% to form a liquid product substantially continuously withdrawn from said reaction zone, preferably at approximately the rate at which it is formed, the ethylene and comonomer being maintained in the reaction zone and feed thereto at approximately the proportion of ethylene and comonomer desired in the product over any substantial period of operation, desirably at a substantially constant ratio varying no more than about ±10% based on the ethylene, the ratio of percent comonomer in the product to percent comonomer in the feed being within the range of 0.7:1 to 1.8:1, desirably 1:1 to 1.6:1, and the proportion of unreacted materials withdrawn from the reaction being accordingly adjusted.

The process of the present invention may be applied to produce homogeneous copolymers from ethylene and specific varieties of comonomers. Generally, the comonomer combined with the ethylene is an unsaturated material containing an acyl (C=O) group, desirably connected by a carbon to carbon linkage to an unsaturated carbon atom, and vaporizable under the conditions required for the process. Specific types of comonomers include the unsaturated acids, both monocarboxylic and polycarboxylic acids, and various salts thereof such as the halogen salts and amides, and esters thereof. Generally, the invention is applied to unsaturated monocarboxylic acid containing 3 to 6 carbon atoms in basic acid molecule, preferably 3 to 5 carbon atoms. The applicable dicarboxylic acid contain between 4 to 8 carbon atoms, preferably 4 to 6 carbon atoms. Specific examples of unsaturated acids copolymerizable with ethylene by the invention include acrylic acid, methacrylic acid, crotonic acid, maleic acid and fumaric acid. Examples of suitable unsaturated acid salts include acrylyl chloride and acrylamide. Esters to which the invention is applied are those of the above-specified acids with the ester groups containing between 1 to 6 carbon atoms, preferably 1 to 2 carbon atoms. Various substituents desirably inert, may of course appear in the ester groups. Examples of suitable esters include methyl acrylate, methyl methacrylate, ethyl acrylate, and dimethylaminoethyl methacrylate.

The process of the invention requires the reaction of specifically selected and proportioned reactants under specifically controlled conditions. Generally, uniformity is the key to production of homogeneous copolymers by the present invention. A first important condition is the maintenance of the reactants substantially entirely in the vapor phase. The reaction is also carried out within an enclosed reaction zone and proper dispersion or mixing of the reactants also is critical. The absence of proper dispersion can lead readily to localized disproportionate concentrations of the ethylene and comonomer and also catalyst and chain transfer agent with the result that the reaction becomes very difficult to control. Inadequate dispersion is further especially undesirable because of the reactivity between the reactants is readily upset under non-uniform conditions such that further disproportionation results and a progressive deterioration of the required equilibrium can readily occur and even lead to a runaway reaction. Satisfactory dispersion or mixing of the reactants and catalyst can be obtained by employing agitators, baffles and other conventional agitating means within the reaction zone. Other procedures conducive to uniform mixing may be also employed. For example, the ethylene may be introduced into the reactor at various locations. Similarly, the chain transfer agent can be combined with the catalyst prior to introduction and such combined stream introduced separately or even combined with the comonomer stream just prior to introduction. Also, the various combined streams can be charged into the reactor at different locations.

Temperatures employed in the process of the invention may vary generally within the range of about 100° C. to 300° C. Lower temperatures result in low conversions and also make it increasingly difficult to maintain desired conditions for product recovery. Temperatures above about 300° C. are unnecessary and also tend to be undesirable because of difficulty in maintaining control of the operation and desired properties of the product. Preferred temperatures are within the range of 140° C. to 220° C. In carrying out the invention, once equilibrium has been established, it is particularly desirable that the reaction temperature be maintained substantially constant, that is, varying by no more than ±15° C., desirably by no more than ±3° C. Maintenance of constant temperature is generally effected by internal indirect cooling of the reaction zone, for example, with cooling coils. Similarly, it is desirable that temperatures throughout the reaction zone be constant and not vary from the average temperature more than ±3° C., thus avoiding so-called "hot-spotting" which can also upset the desired uniformity of the system. Hot-spotting is generally prevented by maintaining sufficient agitation and dispersion of the reactants within the reaction zone.

Pressures employed in carrying out the invention may vary between about 150 to 1000 atmospheres and preferably are in the range between 250 to 600 atmospheres. Pressures lower than 150 atmospheres result in inefficient reaction rates while product molecular weights are also inconsistant and undesirably low to the extent that the products do not develop desired properties. At pressures above about 1000 atmospheres the process is increasingly difficult to properly regulate and also the products tend to have too high molecular weight and viscosity such that fouling of the reactor zone and difficulty in product recovery become serious problems. It is also desirable that pressures at equilibrium vary by no more than ±10%, preferably by no more than ±5%. In our process the specific control of conditions such as temperature and pressures in the vapor phase system employing a chain transfer agent results in ratios of comonomer in the product to comonomer in the feed within the range of 0.7:1 to 1.8:1, and enables the maintenance of a substantially constant comonomer product to feed ratio also varying by no more than about 10%, preferably less than 5%, whereby homogeneous copolymers are produced even at low concentrations of the comonomer in the reaction system. More usually the ratio of percent comonomer in the product to percent comonomer in the feed is within a desired range between 1:1 to 1.6:1. It will be evident that the reaction system is sensitive to changes in temperature and/or pressure and/or concentration of chain transfer agent, etc. While constant temperature and pressure are highly desirable such conditions are not absolutely essential as the same desirable comonomer product to feed ratio and reactivity of ethylene and comonomer may be realized under another combination of process conditions. For example, a variation in pressure will alter the nature of the product in terms of molecular weight and such situation may be corrected and the original balance reestablished by compensating changes in other process conditions. However, as there are numerous interdependent factors involved in equilibrium and reestablishment thereof a complex matter, the maintenance of constant and uniform conditions becomes the desirable mood of practice of the invention for purposes of maintaining product specification and control of the reaction system itself.

The process of the present invention requires a chain transfer agent also commonly referred to as a co-reactant because such material participates in the reaction and is actually consumed by eventually combining in the polymerized material to form a teleomerized polymer product. Broadly, the suitable chain transfer agents are compounds containing carbon, hydrogen and oxygen, and are generally saturated compounds in that such compounds are free of olefinic saturation. The chain transfer agent is also maintained in the vapor phase during the process of the invention and hence the lower boiling materials will be employed in practice. It is therefore generally desirable that the chain transfer agent have a boiling point below 200° C. at atmospheric pressure, preferably below 150° C. The preferred saturated chain transfer agents or C—H—O compounds contain not more than 4 carbon atoms and not more than 2 oxygen atoms. Aralkyl compounds preferably contain not more than 2 alkyl side chains. Compounds which contain at least one CH or $CH_2$ group are generally more reactive than analogous compounds containing carbon combined with hydrogen in the form of only $CH_3$ groups. Compounds especially preferred have 2–4 aliphatic carbon atoms, not more than 2 oxygen atoms, and at least one CH or $CH_2$ group. Suitable compounds include alcohols e.g. methanol; ethanol; normal and isopropanols; primary, secondary and tertiary butanols; cyclohexanol; diacetaone alcohol; also ethers, e.g. dimethyl, diethyl and diisopropyl ethers; also ketones e.g. acetone; methyl ethyl ketone; isobutyl ketones; cyclohexanone; also esters, e.g. methyl, ethyl, propyl and butyl formates, acetates, propionates butyrates, malonates, orthoformates; acids such as acetic, propionic, and butyric acids; and the corresponding acid anhydrides and the corresponding aldehydes; also ethylene oxide; dioxolane; dioxane; methyl, ethyl, propyl, and butyl acetals; lactones; furanes; glycol diacetate, etc.; also toluene, ethylbenzene, cumene, n-propylbenzene, butylbenzenes; amyl benzenes, etc. An especially preferred agent is isopropanol. The amount of chain transfer agent as well as the particular agent employed and general reaction conditions are factors influencing the product and the production of homogeneous materials. Hence, it is also generally desirable to maintain a substantially constant concentration of chain transfer agent within the reaction zone once equilibrium has been established, preferably varying by no more than ±20%, more preferably no more than ±10%. The actual amount of chain transfer agent may vary fairly widely from between about 2% to 40% based on the total weight of the feed to or total charge in the reaction zone, more usually between about 15 to 30% depending largely on the comonomer, the reaction conditions and nature of the product desired. Pressure is a factor having a major influence on the amount of chain transfer agent to be employed. As a general proposition the larger amounts of chain transfer agent and lower pressures tend to produce the lower molecular weight products, and a further such imbalance of these two factors beyond permissible limits will result in products which are undesirably soft, or even liquid. Excessive amounts of the chain transfer agent may also tend to dissolve the product in the gas phase and upset the desired equilibrium of the reaction. On the other hand, the smaller amounts of chain transfer agent and the higher pressures tend to produce the higher molecular weight products, and further such imbalance beyond permissible limits will result in products which can not be effectively recovered and which further may undesirably become cross-linked.

The process of the invention employs a catalyst of the free radical type. Such materials also represent very well known classes of catalytic compounds useful in polymerization reactions and other chemical reactions generally. Among suitable catalysts are peroxy catalysts, perhalo catalysts, azo catalysts, etc. moderately stable at 100° C. or above. Specific examples include hydrogen peroxide, acetyl peroxide, diethyl peroxide, lauroyl peroxide, benzoyl peroxide, cumene hydroperoxide, tertiary butyl hydroperoxide, di-tertiary butyl peroxide, molecular oxygen, benzalazine, acetone oxime, etc. Suitable catalyst proportions are from about 0.1 to about 10 percent by weight based on the weight of the chain transfer agent or co-reactant which is injected into the reactor, preferably between 0.5 to 5 percent by weight of the weight of the chain transfer agent. The particular catalyst employed is desirably one which is sufficiently stable to produce reaction with induction period at temperatures such as about 100° C. or above, i.e. it must decompose non-explosively at the reaction temperatures and concentrations.

The process of the present invention is desirably carried out in an enlarged pressure-resistant reactor equipped with suitable inlets for the various feed streams and single outlet for the off-gas and withdrawal of product in liquid molten condition. A suitable reactor is preferably of greater height than width and includes an agitator and baffles or other suitable means for thoroughly dispersing the reactants and preferably vertically disposed cooling tubes adapted to take up the exeothermic heat of reaction and maintain constant temperature conditions. The eythlene may be introduced at one or more locations as through a line at the top of the reactor. The chain transfer agent and free radical catalysts may be combined and introduced at an upper portion of the reactor. The comonomer to be polymerized with the ethylene may be fed from a separate source and combined with the feed stream containing transfer agent and catalyst for purposes of introduction into the reactor. Start-up of the process can be important for optimum efficiency and desirable begins with introduction of ethylene into the reactor in an amount sufficient to establish a pressure in the vicinity of the desired operating pressure. At time of ethylene introduction the reactor is preferably preheated to about reaction temperature. The initial introduction of ethylene may be immediately proceeded or followed by the introduction of chain transfer agent or coreactant in approximately the predetermined operating ratio of ethylene to co-reactant. After the desired ethylene pressure has been established a continuous feed or free radical initiator and chain transfer agent is begun and a suitable off-gas withdrawal rate approximating that to be employed during the process is established by permitting gas to vent through the product withdrawal and off-gas line and then through or let down by a metering valve in said line. After catalyst introduction there is a period of induction lasting usually from about 10 to 60 minutes, more usually 15 to 40 minutes, before ethylene polymerization commences which is evidence by an increase in temperature of the vaporous components in the reactor or other observable factors such as an increase in cooling water consumption rate necessary to maintain constant temperature. Following the commencement of the ethylene polymerization, desirably after the first certain indications thereof, the feed of comonomer is commenced at a continuous rate equivalent to that desired during operation. After addition of the comonomer the polymerization continues and proceeds towards equilibrium which generally requires an additional time period between about ¼ to 5 hours, depending largely upon the reactivity of the comonomer. Sampling of the product during the period prior to equilibrium is recommended to determine more accurately the time when equilibrium is reached. During this period the product recovered is generally discharged as likely to contain non-homogeneous material and as being off-specification, especially during the earlier polymerization stages prior to equilibrium. At equilibrium there is generally no need to continue external heating of the reactor as the polymerization reaction is exothermic and thermally self-sustaining under the conditions of operating of the invention with constant temperature maintained by means of the internal cooling system. The above start-up procedure is that preferably employed with the more reactive comonomers such as acrylic acid. With such more reactive monomers equilibrium is usually reached in a matter of ¼ to 1 hour after catalyst introduction. In the case of the less reactive comonomers such as the acrylates the procedure is generally the same except that it is preferred to introduce the comonomer at desired comonomer concentration along with the initial ethylene prior to catalyst introduction. In this manner the time to equilibrium may be somewhat reduced but nevertheless is usually in excess of one hour up to as much as 5 hours with the less reactive comonomers. Recovery of liquid molten homogeneous copolymer product descending to bottom of the reactor is effected as long as operating conditions remain substantially under control. Generally, equilibrium and conditions necessary to produce a homogeneous product may be maintained for extended time periods before factors disruptive of equilibrium cause shut down and clean up of the reaction equipment and restart of the operation. The product descending to the lower portion of the reactor is desirably discharged therefrom more or less continuously or essentially at the rate at which molten product is formed within the reactor. In carrying out the invention it is also desirable to maintain a minimum amount of molten polymer product within the reactor to avoid excessive contact of the vaporous reactor contents with the polymer product. Generally, substantial amounts of off-gas are withdrawn dissolved in the molten product and the product in the reactor may be effectively minimized by withdrawing a slight excess of gas over the amount dissolved such that the discharging material in a sense is blown through the discharge. For this purpose the reactor bottom is preferably conical with the apex downwardly disposed and leading into the product and off-gas discharge line. The molten product and off-gases discharged from the reactor are passed through the metering or let down valve and the normally gaseous components vented off for recovery and/or recycle by collecting the crude molten product in a suitable recovery vessel equipped with a venting outlet to permit removal of gases and vapors released from the crude product. Such vapors may be treated by suitable procedures such as absorption and/or scrubbing to remove and optionally recover chain transfer agent or other condensable materials discharged from the reactor. If desired, the liquid product from the recovery vessel may be further purified by various means, for example, by countercurrent contact with steam as conventional in treating or deodorizing wax products. Generally, the ethylene employed in carrying out the invention is of at least commercial purity of 95%, preferably at least 99% purity, and is desirably dry or dried by conventional means with respect to water vapor prior to introduction into the reactor. The comonomer feed is also preferably of equivalent purity and also dry with respect to water vapor. Under the conditions of operation of the process ethylene can be combined with the various comonomers specified herein in all proportions up to about 50% by weight of the comonomer to produce homogeneous copolymers in efficient yields and at high conversions generally exceeding 50%, more usually exceeding 60%, with the notable exception observed with the acrylic acid comonomer which at concentrations above about 10% tends to have a depressant effect on the polymerization. For this reason we prefer not to exceed about 15% acrylic acid in operations adapted to be carried out at the higher conversion rates.

The present invention is specifically directed to the production of low molecular weight homogeneous copolymers and the term "homogeneous" may be defined for purposes of the invention as indicating polymer products which are essentially free of homopolymers of ethylene. The presence or absence of ethylene homopolymer in the product may be determined by methods known to those skilled in the art, for example, by infrared analysis of samples obtained on solvent fractionation of the product to obtain curves which may be compared with the curve obtained on the original polymer sample and/or from a standard ethylene homopolymer sample. The homogeneity of certain specific polymers produced by the invention may be determined or recognized by specific procedures. For example, polymer products which are emulsifiable and have acid numbers above about 20, especially 30 or more, will form emulsions which are clear and free of curds when the products are homogeneous whereas products of equivalent acid number which are not homogeneous will emulsify, if at all, to give cloudy emulsions containing curds. The present invention is more specifically directed to a process in which ethylene is the major unsaturated polymerizable component or monomer in the feed to produce copolymer products in which ethylene is the major constituent. The ethylene desirably constitutes at least 65% by weight of the monomer feed and the comonomer from 1.0% to 35% of the feed, preferably 2 to 20% by weight of the feed. Under the specific conditions of our vapor phase polymerization the ratios by weight of the monomers in the feed and in the product are desirably substantially constant and variance in ratio between feed and product at most only minor such that products obtained by the invention contain a major portion of ethylene and generally 0.8% to 35% by weight of the comonomer, preferably 2.0% to 20% by weight of the comonomer with optimum portions depending largely on the particularly comonomer and intended use of the copolymer product. Generally, having less than a major portion of ethylene in the feed increasingly tends to produce products of undesirable softness. Having less than about 1% ethylene in the monomer tends to make it increasingly difficult to insure production of homogeneous polymers although one advantage of the invention is that homogeneous polymers may be produced with 1% or even somewhat less ethylene in the feed. It will be evident that advantageous feature of our process is the ability to maintain ratios of comonomer in the product to comonomer in the feed within the range of 0.7:1 to 1.8:1 which represent ratios substantially different than those commonly encountered in previously proposed processes with comonomers such as acrylic acid. The copolymers produced by the invention are of low molecular weight ranging generally between about 500 to 5,000 number average molecular weight, preferably between 1,000 to 3,000 number average molecular weight, as measured by a vapor pressure osmometer. The copolymers also desirably have viscosity not exceeding about 1500 centipoises at 140° C., preferably between 100 to 1200 centipoises at 140° C. A variety of new and useful copolymers are provided by the present invention. Of special interest are the homogeneous copolymers of ethylene and acrylic or methacrylic acid containing 1% to 20% by weight acrylic acid or methacrylic acid in the copolymer, preferably 3.5% to 12%, and further characterized by a number average molecular weight between 500 to 5000, preferably 1500 to 4000, acid number between 10 to 200, preferably 20 to 130, and hardness (0.1 mm. penetration) between 0.5 to 30, preferably 1 to 10 when tested at room temperature (77° F.) with an ASTM needle with a load of 100 grams for 5 seconds. The preferred ethylene-acrylic acid copolymers having density from 0.91 to 0.95, more usually 0.925 to 0.945, and acid number above about 20 may be emulsified and the copolymers also characterized by acid number within the range of 25 to 60, especially 30 to 55, are particularly outstanding in giving clear emulsions capable of producing coating having high gloss. Other uses generally for the ethylene-acrylic acid copolymer of the present invention will be evident to those skilled in the art who will find special advantages because of the relatively low molecular weight and homogeneity of the polymers. Similar products are produced by the polymerization of ethylene and methacrylic acid. Most advantageous features of the class of acrylic acid copolymers provided by the invention are that such copolymers are melt stable over extended time periods and also water white in appearance. A further specific feature is that the copolymers may be made substantially entirely odor-free by simple stream treatment or deodorizing. Also of special interest are the low molecular weight homogeneous copolymers of ethylene with the acrylates including especially methyl acrylate and methyl methacrylate containing 1 to 25% by weight of methyl acrylate or methyl methacrylate, preferably 4% to 15% and having number average molecular weight between 500 to 5000, preferably 1500 to 4000. The ethylene-methyl acrylate copolymers are further characterized by hardness (.1 mm. penetration) between .5 to 40, more preferably 1 to 25, and softening point between 180° F. to 230° F. by ASTM ring and ball, and density commonly between 0.905 to 0.925. The ethylene-methyl methacrylate copolymers are further characterized by hardness (0.1 mm. penetration) between .5 to 80, more preferably 1 to 40, softening point between 125° F. to 200° F. by ring and ball, more preferably 135° F. to 190° F., and density between 0.80 to 0.82 gm./cm.$^3$. The copolymers of ethylene with such acrylates are especially useful as viscosity modifiers and pour point depressants, for example, in lubricating oil. Another especially useful product provided by the invention is the homogeneous copolymer of ethylene and 0.7% to 20% by weight, preferably 1% to 10% of dimethylaminoethyl methacrylate, said copolymer having number average molecular weight between 500 to 5000, preferably 750 to 3500, and hardness (0.1 mm. penetration) between .5 to 20, more usually 1 to 8. Such copolymers are useful, for example, in the preparation of wax polishes. Copolymers within the class of the acrylate copolymers provided by the invention are also characterized by excellent melt stability, water-whiteness, and freedom of odor. Copolymers of ethylene and 1% to 25% of acrylamide, preferably 2–15% acrylamide, are also readily emulsified for use in both polishes and textile finishing. The ethylene-acrylamide copolymers provided by the invention desirably have number average molecular weight between 500 to 5000, preferably 1000 to 3500, hardness (0.1 penetration) between 0.5 to 30, preferably 1 to 10 and softening point by ASTM ring and ball between 200° F. to 260° F., more preferably between about 210 to 240° F. The acrylamide copolymers are also melt stable, water white and odor free. Also provided by the invention are homogeneous low molecular weight copolymers of ethylene and maleic or fumaric acid characterized by number average molecular weight between 500 to 5000, more usually between 1000 to 3500, acid number between 4 to 130, preferably 10 to 60, and hardness (0.1 mm. penetration) between 5 to 100, preferably 6 to 30. The ethylene maleic acid copolymers and ethylene-fumaric acid copolymers contain about 1 to 30% of the acid comonomer, preferably 2% to 15%, and are generally softer than the ethylene-acrylic acid copolymers although also emulsifiable and useful as waxes and polishes and other applications. The fumaric acid and maleic acid copolymers are also useful in polishes containing nigrosine dyes. The fumaric and maleic acid copolymers are also melt stable but commonly brownish in color.

The following examples in which parts and percentages are by weight unless otherwise noted demonstrate the practice and advantages of the present invention.

EXAMPLE 1

A two cubic foot high pressure reactor equipped with a stirrer was initially charged with 6500 cc. of isopropyl alcohol. Essentially dry ethylene of greater than 99% purity was taken from an ethylene source and stored in a reservoir after compression by a compressor to 8000 p.s.i. The gaseous ethylene was then withdrawn from the reservoir and metered to the reactor in an amount sufficient to establish an ethylene pressure in the reactor of 7000 p.s.i.g. A catalyst solution of about 0.590% by weight ditertiary-butyl peroxide in isopropyl alcohol is maintained in a separate reservoir and delivered by a catalyst pump to the autoclave at a temperature of about 30° C. and uniform rate of 2200 cc./hr. At the onset of polymerization as evidenced by an increase in reactor temperature (after about 50–60 minutes) the introduction of acrylic acid comonomer is begun by withdrawing liquid acrylic acid and pumping the same into the autoclave at a temperature of about 30° C. and uniform feed rate of 340 cc./hr. such that the acrylic acid represented about 4% by weight of the total feed of ethylene and acrylic acid. Polymerization continued and equilibrium was attained after about 4 to 5 hours at a copolymer production rate of 12–15 lbs./hr. At equilibrium the reaction mixture temperature was 157.5° C. ±3° C. maintained by means of water-cooled cooling fingers vertically disposed within the reactor. Ethylene feed rate at equilibrium sufficient to maintain a pressure of 7000 p.s.i.g. ±100 p.s.i.g. the feed ratio by weight of ethylene to acrylic acid of about 96 to 4. The off-gas flow at equilibrium was 5.0 lbs./hr. and contained ethylene and acrylic acid in proportion of about 98 to 2 by weight along with unreacted isopropanol and water vapor as well as more or less trace amounts of catalyst and normally gaseous impurities. The liquid product settling to the bottom of the autoclave was withdrawn therefrom and through a high pressure valve at a uniform rate of 12–15 lbs./hr. with minimum accumulation of the liquid product on the autoclave bottom which was of conical shape. The crude molten product was settled to released volatile and subjected to steam deodorization. The resulting product was a hard waxy material having an acid number of 39, viscosity of 540 centipoises at 140° C., and hardness of 2.0 (mm. penetration at 77° F.) Acrylic acid in the polymer was 5% by copolymer total weight such that the ratio of percent comonomer in the product to percent comonomer in the feed was 1.25. Conversion over a total reaction period of 150 hours was a high 74%. Density of the polymer was about 0.934.

The ethylene-acrylic acid copolymer produced above was found to be fully emulsifiable by first charging 40 parts of the copolymer to suitable mixing vessel and heating the same thereon to a temperature of 125° C. along with 10 parts of a nonylphenoxypoly(ethyleneoxy) ethanol surface active agent obtained under the trademark "Igepal" CO-710. In a separate mixing vessel 150 parts water is heated to 95–97° C. and in still another vessel 0.85 of potassium hydroxide is dissolved in 1.5 parts of ethylene glycol and heated to about 95–120° C. The potassium hydroxide in the ethylene glycol was then added to the copolymer-emulsifier solution and agitated therewith at about 120–125° C. until the evolution of bubbles ceased. The resulting copolymer solution was then added with agitation to the hot water with addition being made below the surface of the water and close to the vessel agitator. The agitated charge readily formed into a milky-white emulsion found to be free of curds and of excellent utility on a coating material.

In addition to the non-ionic emulsion produced above the copolymer was also formed in an anionic emulsion employing a similar procedure except that the emulsifier system was composed of 8 parts of oleic acid and 8 parts of morpholine with the morpholine being added to the combined solution of copolymer and oleic acid. This emulsion was amber in color and had the particular feature of being transparent.

EXAMPLES 2–4

Employing the apparatus and procedure of Example 1 additional ethylene-acrylic acid homogeneous copolymers are produced as follows:

| Example | 2 | 3 | 4 |
|---|---|---|---|
| Feed, percent acrylic acid | 11.8 | 6.15 | 2 |
| Temperature, °C | 150 | 200 | 200 |
| Pressure, p.s.i | 7,000 | 5,500 | 5,500 |
| Isopropanol, ml | 2,000 | 2,300 | 2,300 |
| Catalyst, ml | 12 | 12 | 10 |
| Yield, pounds per hour | 10 | 12.6 | 12.7 |
| Conversion, percent | 67 | | |
| Off-gas, pounds per hour | 5 | 4.5 | 4.5 |
| Reaction time, hours | 5 | | |
| Copolymer, percent acrylic acid | 15 | 6.4 | 2.6 |
| Ratio, percent comonomer product/percent comonomer feed | 1.27 | 1.04 | 1.3 |
| Viscosity (cps. at 140° C.) | 1,150 | 115 | 125 |
| Hardness (mm. penetration) | 6.5 | 22 | 18.5 |
| Acid number | 118 | 50 | 20 |

EXAMPLES 5–6

Employing the apparatus and procedure of Example 1 homogeneous copolymers of ethylene and methyl acrylate are produced as follows:

| Example | 5 | 6 |
|---|---|---|
| Feed, percent comonomer | 5.25 | 11.3 |
| Temperature, °C | 181 | 183 |
| Pressure, p.s.i.g | 7,000 | 7,000 |
| Methyl acrylate, cc./hour | 500 | 920 |
| Isopropanol, cc./hour | 1,000 | 1,670 |
| Catalyst, 50% $H_2O_2$, cc./hour | 49 | 9 |
| Yield, pounds/hour | 14.8 | 10.7 |
| Off-gas, pounds/hour | 5.2 | 5.2 |
| Conversion, percent | 74 | 63 |
| Sample, percent comonomer | 6.5 | 11.3 |
| Ratio, percent comonomer product/percent comonomer feed | 1.22 | 1.0 |
| Hardness (0.1 mm. penetration) | 6.5 | 18.5 |
| Viscosity (cps. at 140° C.) | 290 | 170 |
| Soft point (° F. ring and ball) | 211.5 | 209 |
| Density | 0.919 | 0.910 |
| Number, average molecular weight | 3,090 | 2,400 |
| Viscosity, average molecular weight | 3,500 | 3,000 |

EXAMPLES 7–9

Employing the apparatus and procedure of Example 1 homogeneous copolymers of ethylene and methyl methacrylate are produced as follows:

| Example | 7 | 8 | 9 |
|---|---|---|---|
| Feed, percent comonomer | 5.6 | 9.6 | 19.0 |
| Temperature, °C | 186 | 185 | 184 |
| Pressure, p.s.i.g | 7,000 | 7,000 | 7,000 |
| Methyl methacrylate, cc./hour | 590 | 960 | 1,960 |
| Isopropanol, cc./hour | 1,258 | 1,383 | 1,195 |
| Catalyst, 50% $H_2O_2$, cc./hour | 32 | 67 | 65 |
| Yield, pounds/hour | 16.7 | 15.7 | 16.2 |
| Off-gas, pounds/hour | 5 | 5 | 5 |
| Conversion, percent | 77 | 76 | 73 |
| Sample, percent comonomer | 6.6 | | |
| Ratio, percent comonomer product/percent comonomer feed | 1.18 | | |
| Hardness (0.1 mm. penetration) | 22 | 64 | 66 |
| Viscosity (cps. at 140° C.) | 745 | 190 | 490 |
| Color, K-S 42 | 42 | 51 | 50 |
| Softening point (° F. ring and ball) | 179 | 143 | 152 |
| Density | 0.804 | 0.806 | |
| Number, average molecular weight | 2,610 | | |
| Viscosity, average molecular weight | 8,000 | | |

EXAMPLE 10-13

Employing the apparatus and procedure of the preceding examples, homogeneous copolymers of ethylene and dimethylaminoethyl methacrylate as prepared as follows:

| Example | 10 | 11 | 12 | 13 |
|---|---|---|---|---|
| Feed, percent comonomer | 1 | 2.05 | 2.95 | 5.15 |
| Temperature, °C | 161 | 170 | 157 | 162 |
| Pressure, p.s.i.g | 7,000 | 7,000 | 7,000 | 7,000 |
| DMAEMA,[1] cc./hour | 85 | 180 | 286 | 475 |
| Isopropanol, cc./hour | 2,000 | 2,000 | 2,000 | 1,700 |
| Catalyst, DTBP, cc./hour | 8 | 9 | 10 | 12 |
| Yield, pounds/hour | 12.4 | 12.6 | 13.7 | 13.2 |
| Off-gas, pounds/hour | 5 | 5.75 | 6.25 | 6 |
| Conversion, percent | 71 | 69 | 70 | 69 |
| Sample, percent comonomer | 0.72 | 2.670 | 4.05 | 7.6 |
| Ratio, percent comonomer product/percent comonomer feed | .72 | 1.30 | 1.37 | 1.47 |
| Hardness (0.1 mm. penetration) | 3.5 | 3 | 2.5 | 5 |
| Viscosity (cps. 140° C.) | 200 | 300 | 260 | 250 |

[1] DMAEMA is dimethylaminoethyl methacrylate.

EXAMPLES 14-17

Employing the apparatus and procedure of the proceding examples homogeneous copolymer of ethylene and acrylamide are prepared as follows:

| Example | 14 | 15 | 16 | 17 |
|---|---|---|---|---|
| Feed, percent comonomer | 1 | 2.04 | 4.2 | 5.37 |
| Temperature, °C | 159 | 160 | 159 | 162 |
| Pressure, p.s.i.g | 7,000 | 7,000 | 7,000 | 7,000 |
| Acrylamide, gram/hours | 92 | 176 | 360 | 490 |
| Isopropanol, cc./hours | 2,000 | 2,200 | 2,500 | 2,500 |
| Catalyst DTBP, cc./hours | 8 | 8 | 8 | 9 |
| Yield, pounds/hours | 14.4 | 12.8 | 12 | 13.6 |
| Off-gas, pounds/hours | 6 | 6.25 | 6.25 | 6.5 |
| Conversion, percent | 70 | 67 | 66 | 69 |
| Sample, percent comonomer | 1.33 | 2.78 | 4.46 | 8.14 |
| Ratio, percent comonomer product/percent comonomer feed | 1.33 | 1.36 | 1.06 | 1.52 |
| Hardness (0.1 mm. penetration) | 2 | 2 | 2 | 2.5 |
| Viscosity (cps. at 140° C.) | 410 | 440 | 460 | 910 |
| Softening point (° F. ring and ball) | 230 | 230 | 225 | 222 |

EXAMPLE 18

Employing the apparatus and procedure of the preceding examples a homogeneous copolymer of ethylene and maleic acid was prepared as follows:

| | Ex. 18 |
|---|---|
| Feed, percent comonomer | 3.7 |
| Temp., °C. | 180 |
| Press. p.s.i.g. | 7000 |
| Maleic anhydride, g./hr. | 225 |
| Isopropanol, cc./hr. | 1700 |
| Catalyst, 50% $H_2O_2$, cc./hr. | 225 |
| Yields, lbs./hr. | 8.5 |
| Off-gas, lbs./hr. | 5.0 |
| Conversion, percent | 63 |
| Hardness (0.1 mm. penetration) | 8.5 |
| Viscosity (cps. at 140° C.) | 195 |
| Acid number | 22.9 |
| Soft. pt., °F. | 209 |
| Color K-S 42 (Tan) | 180 |
| Density | 0.917 |

EXAMPLES 19-20

Employing the apparatus and procedure of the preceding examples homogeneous copolymers of ethylene and fumaric acid are prepared as follows:

| Example | 19 | 20 |
|---|---|---|
| Feed, percent comonomer | 3.7 | 4.2 |
| Temperature, °C | 185 | 185 |
| Pressure, p.s.i.g | 7,000 | 7,000 |
| Fumaric acid, grams/hours | 150 | 300 |
| Isopropanol, cc./hours | 1,833 | 4,000 |
| Catalyst, 50% $H_2O_2$, cc./hours | 67 | 90 |
| Yield, pounds/hours | 7 | 9.2 |
| Off-gas, pounds/hours | 2 | 6.5 |
| Conversion, percent | 78 | 58 |
| Hardness (0.1 mm. penetration) | 10 | 15 |
| Viscosity (cps. at 140° C.) | 210 | |
| Acid number | 21.2 | 43.6 |
| Softening point, °F | 199.5 | 198.5 |
| Density | .905 | .913 |
| Color, K-S 42 (tan) | 750 | 174 |
| Number, average molecular weight | 2,370 | 1,800 |
| Viscosity, average molecular weight | 2,600 | 1,500 |

In the above Examples 1-17 the product withdrawn from the reactor was collected in a suitable vessel equipped with an overhead outlet and the molten crude product allowed to settle therein at a temperature between 150-180° C. to dispel dissolved volatiles from the product. The molten product was substantailly continuously removed from the bottom of the collection vessel and passed downwardly in a column countercurrent to steam. The resulting polymer product was a clear transparent colorless waxy solid also found to be essentially free of odor of unreacted comonomer. The polymer was also melt stable during all phases of recovery and treatment of the molten product. In the remaining Examples 18-20 similar results was obtained except that the polymer product was brownish in color.

Although certain preferred embodiments of the invention have been disclosed for purpose of illustration, it will be evident that various changes and modifications may be made therein without departing from the scope and spirit of the invention.

We claim:

1. The process for producing low molecular weight homogeneous copolymers of ethylene and other unsaturated monomer members selected from the group consisting of unsaturated monocarboxylic acids of 3 to 6 carbon atoms, salts thereof, and esters thereof containing 1 to 6 carbon atoms in the ester group, unsaturated dicarboxylic acids of 4 to 8 carbon atoms, and esters of said dicarboxylic acids containing 1 to 6 carbon atoms in the ester group, and mixtures thereof; which process comprises subjecting a major portion by weight of ethylene and a minor portion of said other monomer member to reaction along with a chain transfer agent in the presence of a free radical initiator as catalyst, all being substantially in the vapor phase, at a temperature between 100° C. to 300° C. and pressure between 100 to 1000 atmospheres, with turbulent agitation within an enclosed enlarged reaction zone, to form a molten polymerized product which descends to the bottom of the reactor, withdrawing said molten product from the bottom of the reactor at essentially the same rate at which the molten polymer is formed within the reactor, and controlling the feed of ethylene, said other monomer member, chain transfer agent and catalyst to said zone; and controlling temperature and pressure within said zone, and discharge of off-gas from said zone to maintain the ratio of weight percent of said other monomer member in the product to percent of said other monomer member in the feed within the range of 0.7:1 to 1.8:1.

2. The process of claim 1 in which the temperature and pressure and concentrations of chain transfer agent and catalyst within said reaction zone are substantially constant.

3. The process of claim 1 in which said other monomer member is acrylic acid.

4. The process of claim 3 in which acrylic acid fed to the reaction zone is between 2-15% by weight of the total of ethylene and said acrylic acid fed to said zone.

5. The process of claim 1 in which said other monomer member is methacrylic acid.

6. The process of claim 1 in which said other monomer member an acrylate containing 1 to 2 carbon atoms in the ester group.

7. The process of claim 1 in which said other monomer member is dimethylaminoethyl methacrylate.

8. The process of claim 1 in which said other monomer member is selected from the group consisting of fumaric acid and maleic acid.

9. A normally solid, homogeneous copolymer of ethylene and a comonomer selected from the group consisting of acrylic acid, methacrylic acid, fumaric acid, maleic acid, acrylamide and dimethylaminoethyl methacrylate, said copolymer containing at least a major portion of ethylene by weight and having a number average molecular weight between 500 and 5000 and a viscosity between 100 and 1200 centipoises at 140° C., and said copolymer being emulsifiable when the comonomer is acrylic acid, methacrylic acid, fumaric acid, maleic acid or acrylamide.

10. A normally solid, emulsifiable, homogeneous copolymer of ethylene and a comonomer selected from the group consisting of acrylic acid, methacrylic acid, fumaric acid, maleic acid, and acrylamide, said copolymer containing at least a major portion of ethylene by weight and having a number average molecular weight between 500 and 5,000.

11. A copolymer in accordance with claim 10 wherein the comonomer is acrylic acid, said copolymer containing between 1–20% by weight acrylic acid and having an acid number between 10 and 200.

12. A copolymer in accordance with claim 11 wherein the acrylic acid content is between 3.5–12% by weight and the acid number is between 25–60, said copolymer also having a hardness value between 1 and 10 at 0.1 mm. penetration as determined with an ASTM needle with a 100 gram load for 5 seconds at a temperature of 77° F.

13. A copolymer in accordance with claim 10 in which the comonomer is methacrylic acid, said copolymer containing between 1–20% by weight methacrylic acid.

14. A copolymer in accordance with claim 10 wherein the comonomer is fumaric acid, said copolymer containing 1–30% by weight fumaric acid and having an acid number between 4 and 130.

15. A copolymer in accordance with claim 14 wherein the fumaric acid content is between 2–15% by weight and the acid number is between 10 and 60, said copolymer also having a hardness value between 5 and 100 at 0.1 mm. penetration as determined with an ASTM needle with a 100 gram load for 5 seconds at a temperature of 77° F.

16. A copolymer in accordance with claim 10 wherein the comonomer is maleic acid, said copolymer containing 1–30% by weight maleic acid and having an acid number between 4 and 130.

17. A copolymer in accordance with claim 16 wherein the maleic acid content is between 2–15% by weight and the acid number is between 10 and 60, said copolymer also having a hardness value between 5 and 100 at 0.1 mm. penetration as determined with an ASTM needle with a 100 gram load for 5 seconds at a temperature of 77° F.

18. A copolymer in accordance with claim 10 wherein the comonomer is acrylamide, said copolymer containing 1–25% by weight acrylamide.

19. A copolymer in accordance with claim 18 wherein the acrylamide content is between 2–15% by weight, said copolymer also having a hardness value between 0.5 and 30 at 0.1 mm. penetration as determined with an ASTM needle with a 100 gram load for 5 seconds at a temperature of 77° F.

20. A copolymer in accordance with claim 9 wherein the comonomer is dimethylaminoethyl methacrylate, said copolymer containing 0.7–20% by weight dimethylaminoethyl methacrylate.

21. Emulsion of the ethylene-acrylic acid copolymer of claim 12.

22. Emulsion of the ethylene-methacrylic acid copolymer of claim 13.

23. Emulsion of the ethylene-fumaric acid copolymer of the claim 15.

24. Emulsion of the ethylene-maleic acid copolymer of claim 17.

25. Emulsion of the ethylene acrylamide acid copolymer of claim 19.

26. The process of claim 1 carried out at a conversion rate of at least 50 percent.

27. The process of claim 1 wherein the pressure is between 250 and 600 atmospheres.

28. The process of claim 1 wherein the other monomer member is selected from the group consisting of esters of unsaturated monocarboxylic acids of 3 to 6 carbon atoms, the ester group containing 1 to 6 carbon atoms, and unsaturated dicarboxylic acids of 4 to 8 carbon atoms and esters of said dicarboxylic acids containing 1 to 6 carbon atoms in the ester group.

29. The process of claim 1 wherein the other monomer member is selected from the group consisting of methyl acrylate, methyl methacrylate, fumaric acid and maleic acid.

30. The process of claim 26 wherein the other monomer member is selected from the group consisting of methyl acrylate, methyl methacrylate, fumaric acid, maleic, and acrylic acid.

31. The process of claim 30 wherein the pressure is between 250 and 600 atmospheres.

32. The copolymer of claim 9 wherein the comonomer is selected from the group consisting of fumaric acid, maleic acid, acrylamide, and dimethylaminoethyl methacrylate.

References Cited

UNITED STATES PATENTS

| | | | |
|---|---|---|---|
| 3,520,861 | 7/1970 | Thompson et al. | 260—88.1 |
| 2,766,214 | 10/1956 | Erchak et al. | 260—78.5 HC |
| 3,383,373 | 5/1968 | Waples | 260—86.7 |
| 3,402,098 | 9/1968 | Baum et al. | 260—88.1 |
| 3,436,363 | 4/1969 | Helin | 260—78.5 |
| 3,472,825 | 10/1969 | Walter et al. | 260—88.1 |
| 2,646,425 | 7/1953 | Barry | 260—88.1 |
| 3,089,897 | 5/1963 | Balmer et al. | 260—86.7 |
| 3,350,372 | 10/1967 | Anspon et al. | 260—86.7 |

MURRAY TILLMAN, Primary Examiner

W. J. BRIGGS, Sr., Assistant Examiner

U.S. Cl. X.R.

260—78.5 HC, 86.7, 88.1 R, 526 N, 537 N, 561 N